United States Patent
Kim (10) Patent No.: US 11,242,093 B2
(45) Date of Patent: Feb. 8, 2022

(54) ROOF CARRIER FOR VEHICLE

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/878,087

(22) Filed: May 19, 2020

(65) Prior Publication Data
US 2021/0146850 A1  May 20, 2021

(30) Foreign Application Priority Data
Nov. 20, 2019  (KR) ........................ 10-2019-0149185

(51) Int. Cl.
*B62D 25/06*  (2006.01)
*B60R 9/04*  (2006.01)

(52) U.S. Cl.
CPC ............... *B62D 25/06* (2013.01); *B60R 9/04* (2013.01)

(58) Field of Classification Search
CPC .................................................... B62D 25/06
USPC ......... 296/210, 205, 96.21, 203.03, 192, 56, 296/106
See application file for complete search history.

(56) References Cited

U.S. PATENT DOCUMENTS

| | | | | |
|---|---|---|---|---|
| 3,292,969 A | * | 12/1966 | Eggert, Jr. ........... | B62D 23/005 296/205 |
| 3,697,124 A | | 10/1972 | Wessells | |
| 4,045,075 A | * | 8/1977 | Pulver .................... | B62D 21/08 296/205 |
| 5,458,393 A | * | 10/1995 | Benedyk .............. | B62D 23/005 296/203.01 |
| 5,688,021 A | * | 11/1997 | Tomforde ............ | B62D 23/005 296/191 |
| 5,720,511 A | * | 2/1998 | Benedyk .................. | B60N 2/68 296/203.01 |
| 5,800,003 A | * | 9/1998 | Clenet ............... | B29C 66/52298 296/29 |
| 6,000,747 A | * | 12/1999 | Sehgal ..................... | B60J 5/101 296/146.11 |
| 6,241,310 B1 | * | 6/2001 | Patelczyk ............ | B62D 23/005 296/203.01 |

(Continued)

FOREIGN PATENT DOCUMENTS

| | | |
|---|---|---|
| CN | 104192215 A | 12/2014 |
| CN | 106114639 A | 11/2016 |

(Continued)

*Primary Examiner* — Dennis H Pedder
(74) *Attorney, Agent, or Firm* — Slater Matsil, LLP (57) ABSTRACT

A roof carrier for a vehicle is provided. The roof carrier includes roof side tubes extendedly provided on opposite sides of a vehicle body along a front-rear direction of the vehicle from opposite sides of a cowl in a front side of the vehicle to opposite sides of a rear roof rail in a rear side of the vehicle while providing a closed cross section. The roof carrier further includes at least one middle roof rail extendedly provided along a transverse direction of the vehicle to connect the roof side tubes on opposite sides between the cowl and the rear roof rail while providing a closed cross section.

17 Claims, 11 Drawing Sheets

(56) References Cited

U.S. PATENT DOCUMENTS

| | | | | |
|---|---|---|---|---|
| 6,302,478 | B1* | 10/2001 | Jaekel | B23K 26/38 |
| | | | | 296/205 |
| 6,412,857 | B2* | 7/2002 | Jaekel | B62D 23/005 |
| | | | | 296/205 |
| 6,824,204 | B2* | 11/2004 | Gabbianelli | B62D 21/152 |
| | | | | 296/193.06 |
| 6,957,845 | B2* | 10/2005 | Rager | B62D 23/005 |
| | | | | 296/146.9 |
| 7,044,535 | B2* | 5/2006 | Durand | B62D 23/005 |
| | | | | 296/203.01 |
| 2001/0000119 | A1* | 4/2001 | Jaekel | B23K 26/38 |
| | | | | 296/29 |
| 2001/0042986 | A1* | 11/2001 | Patelczyk | B62D 23/005 |
| | | | | 296/29 |
| 2001/0050497 | A1* | 12/2001 | Jaekel | B62D 23/005 |
| | | | | 296/205 |
| 2004/0140693 | A1* | 7/2004 | Gibbianelli | B62D 25/20 |
| | | | | 296/203.01 |
| 2005/0189790 | A1 | 9/2005 | Chernoff et al. | |
| 2006/0175871 | A1* | 8/2006 | Eipper | B62D 25/06 |
| | | | | 296/193.04 |
| 2006/0237996 | A1* | 10/2006 | Eipper | B62D 65/04 |
| | | | | 296/193.04 |
| 2007/0176467 | A1 | 8/2007 | Watanabe et al. | |
| 2010/0090501 | A1 | 4/2010 | Kinoshita et al. | |
| 2014/0354011 | A1* | 12/2014 | Delord | B62D 25/081 |
| | | | | 296/192 |

FOREIGN PATENT DOCUMENTS

| | | |
|---|---|---|
| JP | S6288674 A | 4/1987 |
| KR | 20070076462 A | 7/2007 |
| WO | 2007013275 A1 | 2/2007 |

* cited by examiner

ROOF CARRIER FOR VEHICLE

CROSS-REFERENCE TO RELATED APPLICATIONS

This application claims priority to Korean Patent Application No. 10-2019-0149185, filed on Nov. 20, 2019, which application is hereby incorporated herein by reference.

TECHNICAL FIELD

The present invention relates to a roof carrier for a vehicle.

BACKGROUND

In the conventional monocoque vehicle body, a large number of pails are combined with each other in a complex structure to provide a roof, and the shape and coupling structure of such parts are different for each model of the vehicle.

Therefore, in order to construct a roof of a vehicle of even one model, a large number of molds are required to manufacture parts for constructing the roof of the vehicle. In addition, in order to construct a roof of a vehicle of another model, since molds may not be used in common, another group of different molds is required to be manufactured.

Accordingly, manufacturing a roof of a vehicle according to a different assembly structure for each model using a large number of parts, as described above, is inferior in workability.

The foregoing, described as the related art of the present invention, is intended merely to aid in the understanding of the background of the present invention and is not intended to mean that the present invention falls within the purview of the related art that is already known to those skilled in the art.

SUMMARY

Accordingly, an embodiment of the present invention provides a roof carrier for a vehicle, wherein the roof carrier enables a roof structure required for a vehicle to be easily constructed during the production of a new type of vehicle, while minimizing or not requiring the development of new and/or different molds, and is able to be easily shared with various types of vehicles, thereby allowing the new type of vehicle to be easily developed, and is able to be effectively applied to a multi-product small quantity production method.

In order to achieve the above embodiment, there is provided a roof carrier for a vehicle, the roof carrier including roof side tubes extendedly provided on opposite sides of a vehicle body along a front-rear direction of the vehicle from opposite sides of a cowl in a front side of the vehicle to opposite sides of a rear roof rail in a rear side of the vehicle while providing a closed cross section, and at least one middle roof rail extendedly provided along a transverse direction of the vehicle to connect the roof side tubes on opposite sides between the cowl and the rear roof rail while providing the closed cross section.

The at least one middle roof rail may include a first roof rail provided at a position supporting an upper end of a front windshield glass.

The closed cross section of each of the roof side tubes may be a shape in which a plurality of straight portions are connected to each other in turn by a plurality of bent portions, thereby providing a single closed curve.

An embodiment of the present invention may further include a glass support panel coupled to a section of the roof side tube from the cowl to the first roof rail to support the front windshield glass, and a strip support panel coupled to a lower side of the roof side tube so as to mount a filler weather strip.

The closed cross section of the roof side tube may be integrally provided with a glass support portion that is able to independently support the front windshield glass, and the strip support panel may be coupled to the roof side tube to mount the filler weather strip.

The cowl may include a cowl upper member extendedly provided along a transverse direction of the vehicle in a predetermined closed cross-sectional shape including at least one closed curve, and a cowl lower panel coupled to a lower side of the cowl upper member to partition front and rear sides of the vehicle, at least some section of the cowl lower panel having a predetermined cross-sectional structure along the transverse direction of the vehicle.

A glass mounting bracket for mounting the front windshield glass may be coupled to a front side of the first roof rail, and a roof mounting bracket for mounting a roof may be coupled to a rear side of the first roof rail.

The at least one middle roof rail may include a second roof rail provided between the first roof rail and the rear roof rail, and roof mounting brackets for mounting the roof may be coupled to front and rear sides, respectively, of the second roof rail.

In order to improve coupling performance of a sealer, a dent portion may be locally dented downwardly in a portion coupled to the roof.

The rear roof rail may be extendedly provided along the transverse direction of the vehicle while providing a predetermined closed cross section including at least one closed curve.

A roof mounting bracket for mounting the roof may be coupled to a front of the rear roof rail.

A tailgate mounting bracket for mounting a tailgate may be coupled to a rear of the rear roof rail.

As described above, during the production of a new type of vehicle, embodiments of the present invention may enable a roof structure required for a vehicle to be easily constructed, while minimizing or not requiring the development of new and/or different molds, to be easily shared with various types of vehicles, thereby allowing the new type of vehicle to be easily developed, and to be effectively applied to a multi-product small quantity production method.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings. Throughout the drawings, the same reference numerals will refer to the same or like pails.

Figure 1:
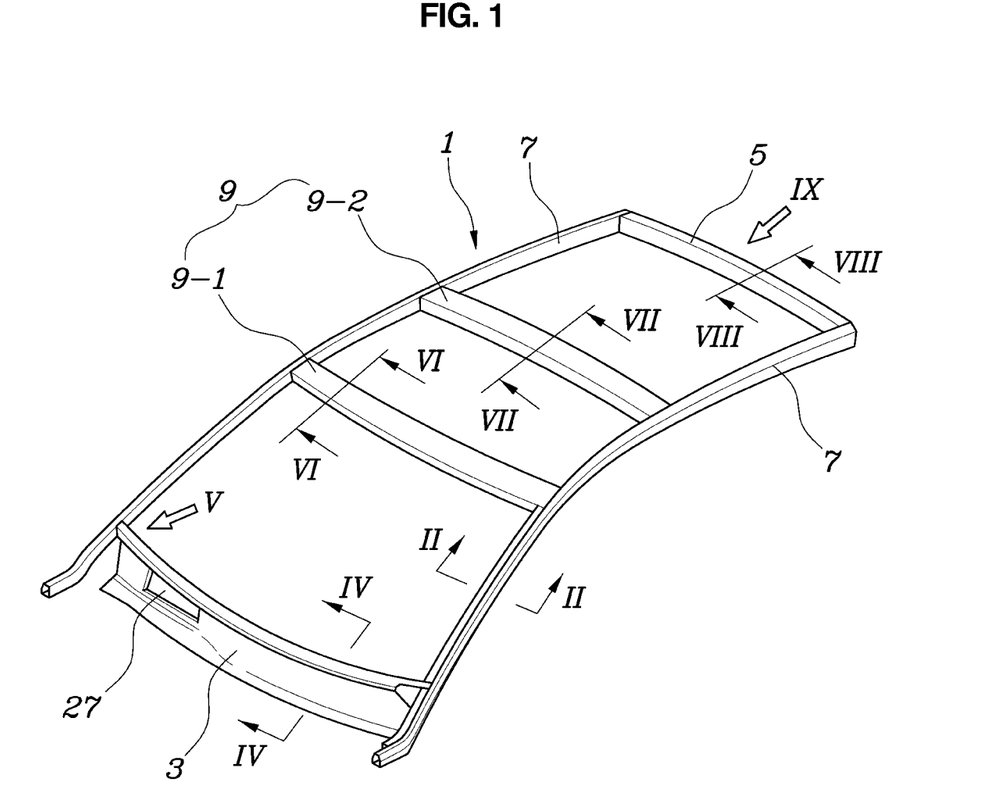
FIG. 1 is a view showing a roof carrier for a vehicle according to an embodiment of the present invention.

With reference to FIG. 1, a roof carrier 1 for a vehicle according to an embodiment of the present invention includes roof side tubes 7 extendedly provided on opposite sides of a vehicle body along a front-rear direction of the vehicle from opposite sides of a cowl 3 in a front side of the vehicle to opposite sides of a rear roof rail 5 in a rear side of the vehicle while providing a closed cross section, and at least one middle roof rail 9 extendedly installed along a transverse direction of the vehicle to connect the roof side tubes on opposite sides between the cowl 3 and the rear roof rail 5 while providing a closed cross section.

That is, an A-pillar and a roof side member, which were usually formed as separate parts in a conventional manner, are integrally provided into one part by the roof side tubes 7, each of which is composed of a hollow closed cross section. Similarly, a cowl 3, a middle roof rail 9, and a rear roof rail 5, each having a hollow closed cross-sectional structure, are coupled to the roof side tubes 7 in turn from the front to the rear of the vehicle, whereby the roof carrier 1 constitutes a space frame structure as shown in FIG. 1.

Figure 2:
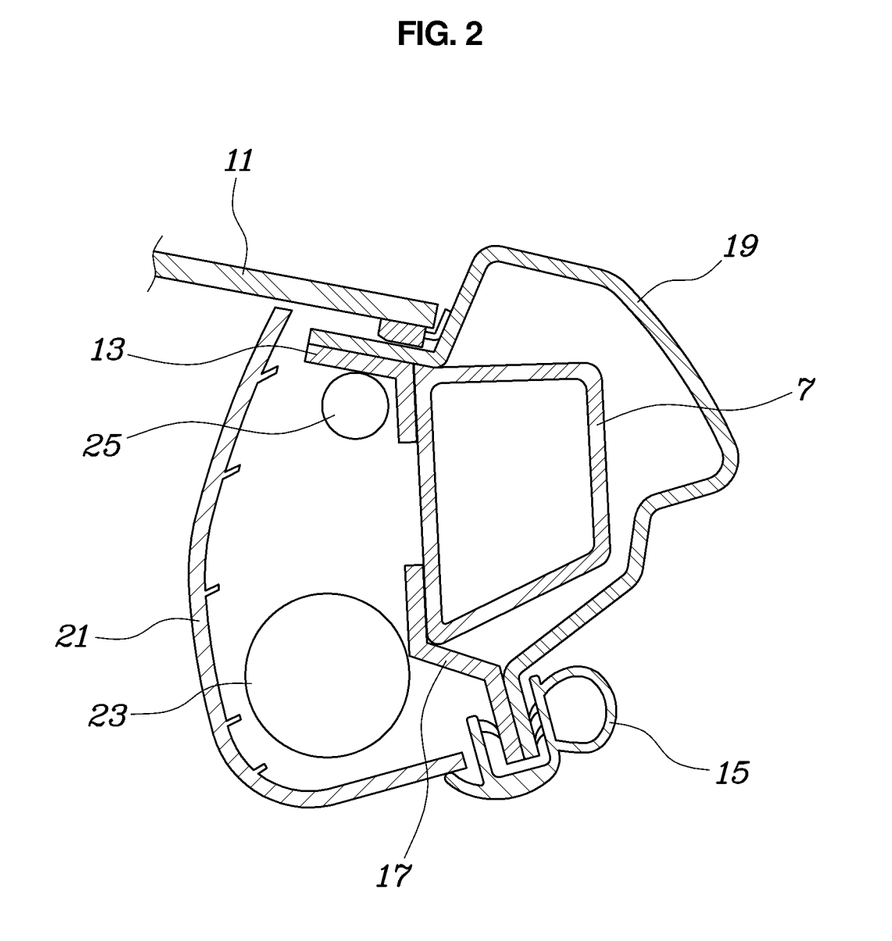
FIG. 2 is a sectional view taken along the line II-II of FIG. 1 corresponding to an A-pillar portion of the vehicle.

At least one middle roof rail 9 includes a first roof rail 9-1 installed at a position supporting an upper end of a front windshield glass 11 (see, e.g., FIG. 2).

That is, the middle roof rail 9 includes the first roof rail 9-1 but may or may not further include additional middle roof rails 9 according to a type or model of the vehicle.

For reference, in the present embodiment of FIG. 1, as will be described later, a second roof rail 9-2, which is an additional middle roof rail 9, is included.

Figure 3:
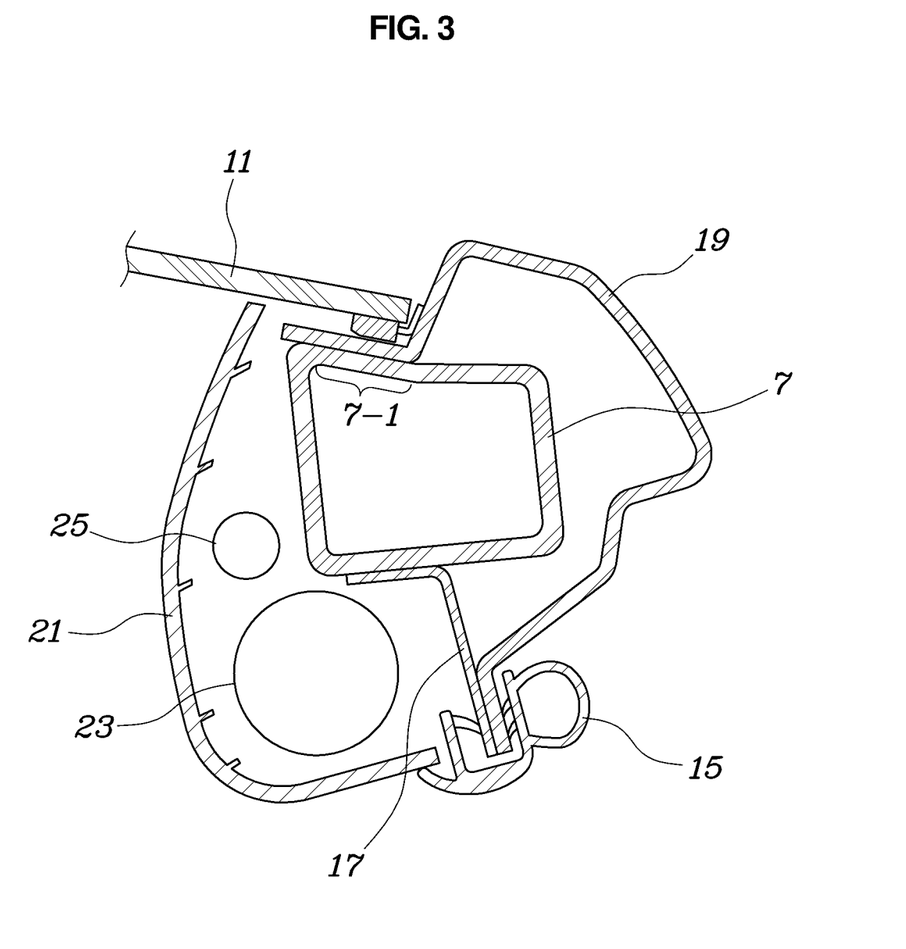
FIG. 3 is a sectional view of a portion corresponding to FIG. 2 as another embodiment of the present invention.

As illustrated in FIGS. 2 and 3, the closed cross section of each of the roof side tubes 7 is a shape in which a plurality of straight portions are connected to each other in turn by a plurality of bent portions, thereby providing a single closed curve.

In particular, the closed cross section of each of the roof side tubes 7 is not provided by joining at least two panels by welding or the like as in conventional art, but may be provided by allowing one tube to be shaped by hydroforming or a hot blow method, thereby forming the space frame structure.

The roof side tubes 7 having the structure described above may be easily applied to various vehicles by extending or reducing the roof side tubes 7 in a longitudinal direction thereof.

In an embodiment of FIG. 2, a glass support panel 13 is coupled to each of the roof side tubes 7 provided as described above to support the front windshield glass 11. Of course, the glass support panel 13 may be coupled only to a section of each of the roof side tubes 7 from the cowl 3 to the first roof rail 9-1.

In addition, a strip support panel 17 is coupled to the lower side of each of the roof side tubes 7 so as to mount a filler weather strip 15.

Figure 14:
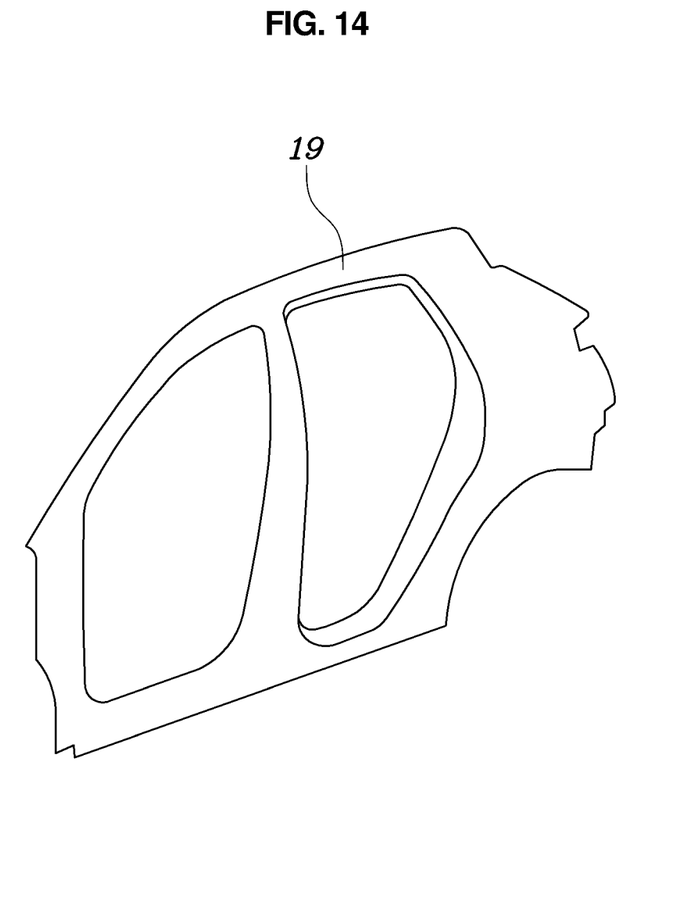
FIG. 14 is a view illustrating a side outer panel capable of being coupled to a side of the roof carrier for the vehicle of FIG. 1.

In FIG. 2, at an outer side of each of the roof side tubes 7, a side outer panel 19 as illustrated in FIG. 14 may be coupled, wherein the side outer panel 19 may be composed of a material such as plastic and the like, thereby allowing an exterior of the vehicle to be flexibly provided.

For reference, in FIG. 2, a front pillar trim 21 is installed at an inner side of each of the roof side tubes 7, and an airbag 23, wiring 25, and the like may be installed in a space provided between the front pillar trim 21 and each of the roof side tubes 7.

On the other hand, in an embodiment of FIG. 3, the closed cross section of each of the roof side tubes 7 is integrally provided with a glass support portion 7-1 that may independently support the front windshield glass 11.

Accordingly, different from the embodiment of FIG. 2 having a structure in which the glass support panel 13 is not provided separately, and only the strip support panel 17 is coupled to mount the filler weather strip 15, the embodiment of FIG. 3 may have an assembly process simplified more than that of the embodiment of FIG. 2.

Figure 4:
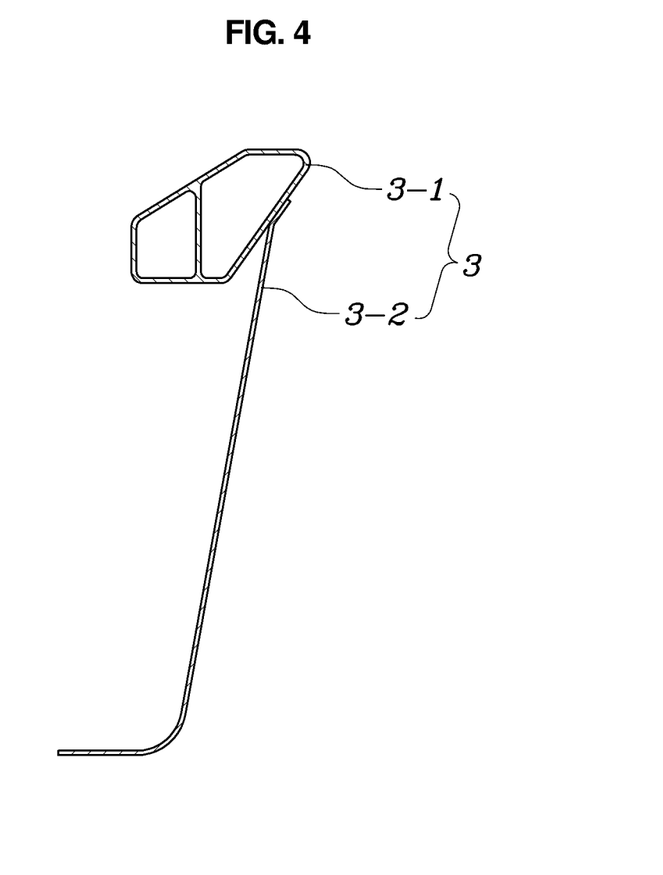
FIG. 4 is a sectional view taken along the line IV-IV of a cowl of FIG. 1.
Figure 5:
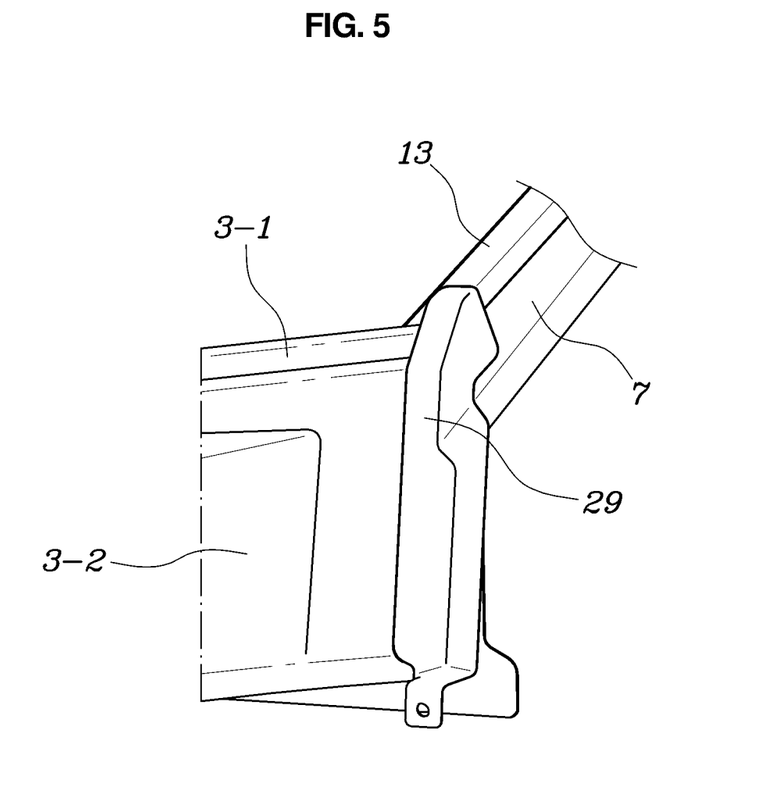
FIG. 5 is a view showing a connection portion between the cowl and a roof side tube in the V direction of FIG. 1.

With reference to FIGS. 1, 4, and 5, the cowl 3 includes a cowl upper member 3-1 extendedly provided along a transverse direction of the vehicle in a predetermined closed cross-sectional shape including at least one closed curve, and a cowl lower panel 3-2 coupled to a lower side of the cowl upper member 3-1 to partition front and rear sides of the vehicle, wherein at least some section of the cowl lower panel has a predetermined cross-sectional structure along the transverse direction of the vehicle.

In the present embodiment, the cowl upper member 3-1 has a closed cross-sectional shape containing two closed curves, and the closed cross-sectional shape as described above simply extends along the transverse direction of the vehicle. Therefore, the cowl upper member 3-1 may be easily modified and applied to various vehicles by changing only the length thereof.

In addition, the cowl lower panel 3-2 has a predetermined cross-sectional structure in a simple panel shape as shown in FIG. 5 for a remaining section excluding a vent hole 27 on a left side as shown in FIG. 1. Therefore, according to the change of the type or the model of the vehicle, the cowl lower panel 3-2 may also be easily changed and adapted to correspondingly.

For reference, as shown in FIG. 5, a cowl coupling bracket 29 is provided at the coupling portion of each of the roof side tubes 7 and the cowl 3, thereby allowing matching between each of the roof side tubes 7 and the cowl 3 to be easily accomplished.

Figure 6:
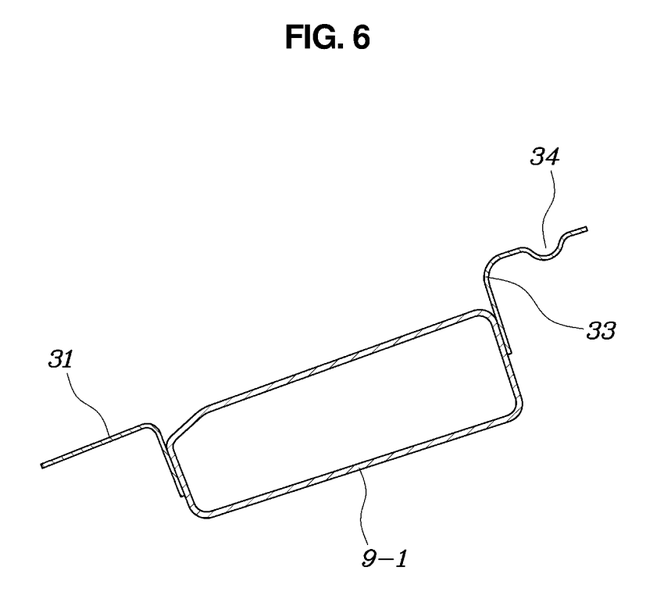
FIG. 6 is a sectional view taken along the line VI-VI of a first roof rail of FIG. 1.

With reference to FIG. 6, a glass mounting bracket 31 for mounting the front windshield glass 11 is coupled to the front side of the first roof rail 9-1, and a roof mounting bracket 33 for mounting a roof is coupled to the rear side of the first roof rail 9-1.

As described above, in the embodiment of FIG. 1, at least one middle roof rail 9 may further include a second roof rail 9-2 installed between the first roof rail 9-1 and the rear roof rail 5.

Figure 7:
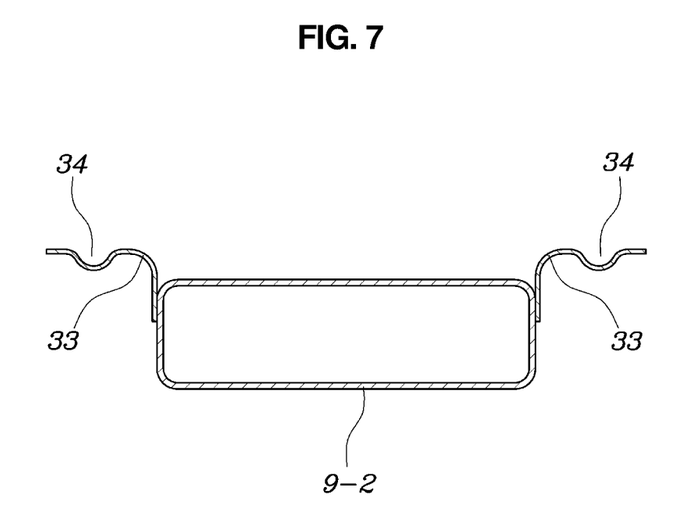
FIG. 7 is a sectional view taken along the line VII-VII of a second roof rail of FIG. 1.

As illustrated in FIG. 7, the roof mounting brackets 33 for mounting the roof are coupled to front and rear sides, respectively, of the second roof rail 9-2.

The roof mounting bracket 33 is a structure in which a dent portion 34 is locally dented downwardly in a portion coupled to the roof in order to improve coupling performance of a sealer.

Figure 8:
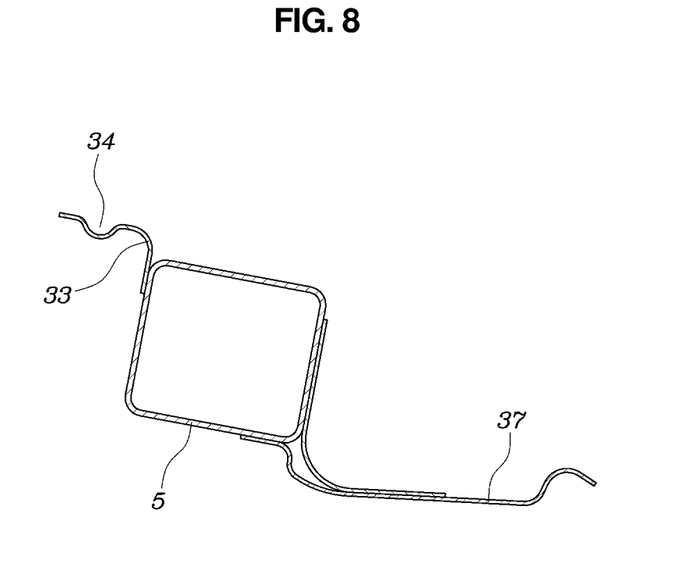
FIG. 8 is a sectional view taken along the line VIII-VIII of a rear roof rail of FIG. 1.

The rear roof rail 5 is extendedly provided along the transverse direction of the vehicle while providing a predetermined closed cross section including at least one closed curve.

In FIG. 8, in the rear roof rail 5, a predetermined closed cross section including one closed curve is extendedly provided along the transverse direction of the vehicle.

Figure 10:
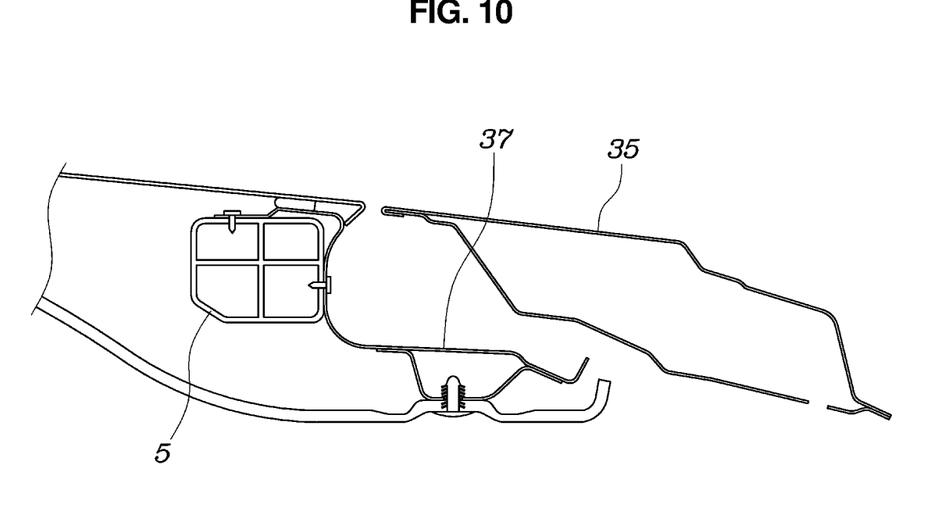
FIG. 10 is a sectional view of a portion corresponding to FIG. 8 as another embodiment of the present invention.

On the other hand, in an embodiment of FIG. 10, the rear roof rail 5 is a structure in which a predetermined closed cross section including four closed curves is extendedly provided along the transverse direction of the vehicle.

All of the first roof rail 9-1 and the second roof rail 9-2, forming the middle roof rail 9, and the rear roof rails 5 are structures where predetermined closed cross sections are each extendedly provided along the transverse direction of the vehicle. Here, each of the structures is allowed to be manufactured by roll forming, aluminum variable extrusion, or the like and easily applied to various vehicles because length thereof may be easily changed.

That is, the roof carrier 1 for the vehicle as described above adjusts the length of the cowl 3, the middle roof rail 9, and the rear roof rail 5 in the transverse direction of the vehicle, and adjusts the length of each of the roof side tubes 7 in the longitudinal direction of the vehicle, thereby being enabling the roof carrier to be easily applied to various vehicles and to be easily shared in various types of vehicles. As a result, the roof carrier 1 may facilitate the development of new vehicles to be performed more easily and to be effectively applied to a multi-product small quantity production method.

In addition, as described above, as all the parts are connected to each other in the form of a tube to form a space frame structure, the roof carrier for the vehicle as above may secure a relatively high rigidity while having a relatively low weight.

A roof mounting bracket 33 for mounting the roof is coupled to a front of the rear roof rail 5.

Figure 9:
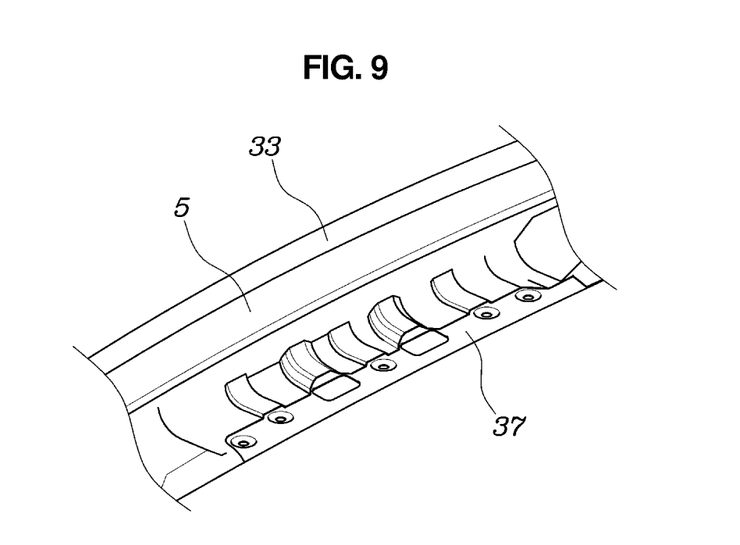
FIG. 9 is a view of the rear roof rail of FIG. 1 observed at the IX direction.

A tailgate mounting bracket 37 for mounting a tailgate 35 may be coupled to a rear of the rear roof rail 5 as illustrated in FIGS. 8 to 10.

However, depending on a vehicle model, rear windshield glass may be mounted on the rear lower side of the rear roof rail 5. In this case, a bracket for supporting the rear windshield glass may be installed at the rear of the rear roof rail 5.

Figure 11:
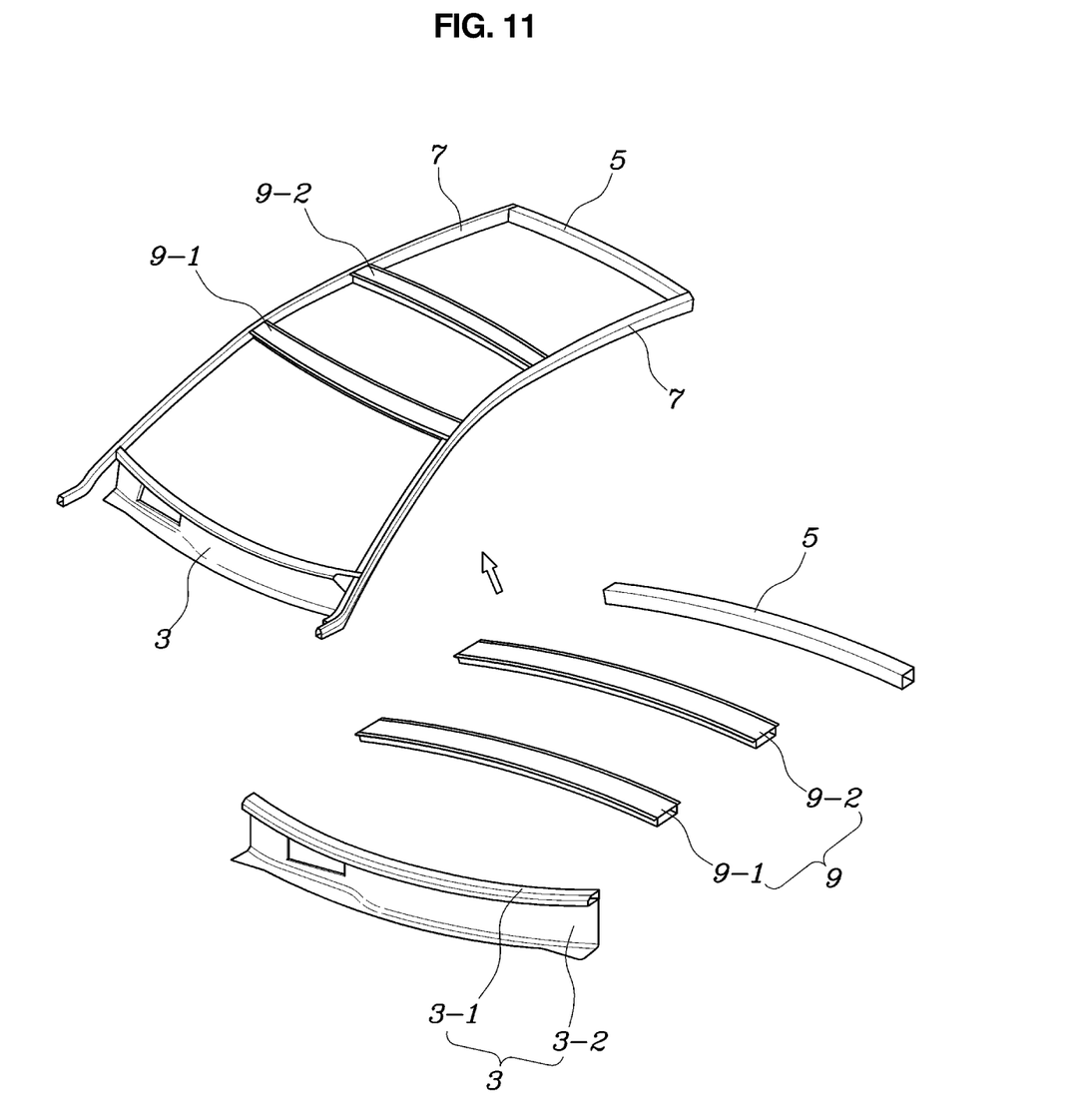
FIG. 11 is a view illustrating an assembling process of the roof carrier for the vehicle of FIG. 1.

FIG. 11, which illustrates an assembly process of the roof carrier 1 for the vehicle as described above, explains how the roof carrier 1 for the vehicle is provided. In order to provide the roof carrier 1, each of the cowl 3, the first roof rail 9-1, the second roof rail 9-2, and the rear roof rail is molded and then coupled, by welding or the like, to the separately molded roof side tubes 7.

Of course, the roof panel (not shown) is coupled to a top side of the roof carrier 1 to complete the roof of the vehicle.

Figure 12:
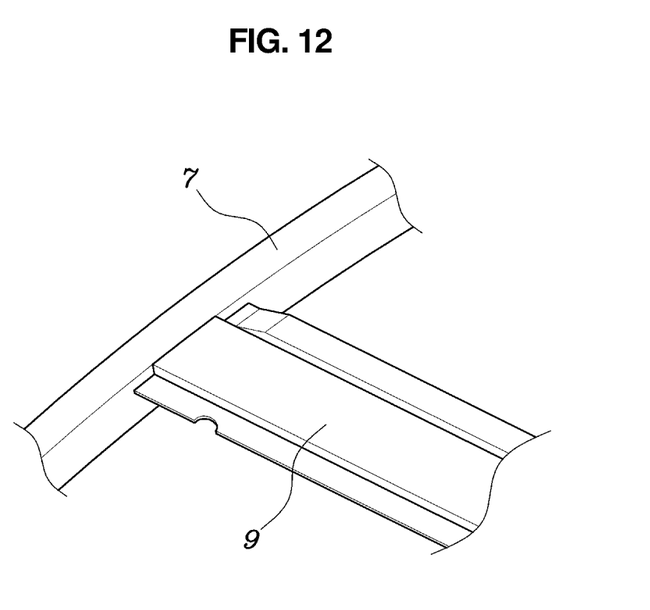
FIG. 12 is a top view of a structure in which a middle roof rail of FIG. 1 is connected to the roof side tube.
Figure 13:
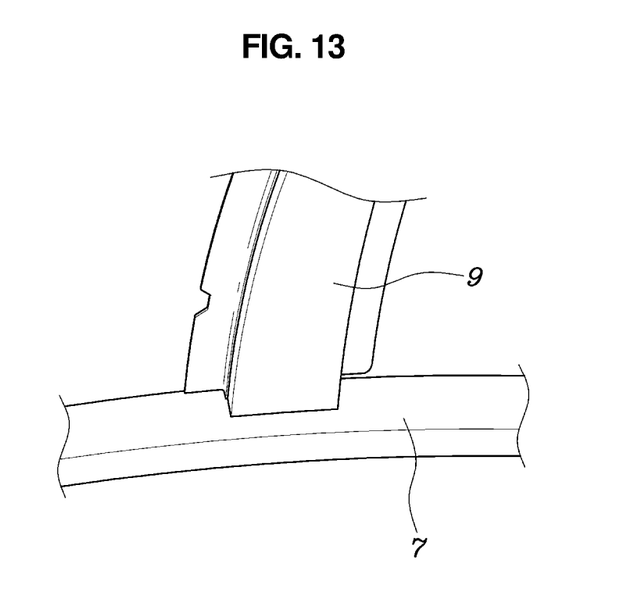
FIG. 13 is a bottom view of a structure in which the middle roof rail of FIG. 1 is connected to the roof side tube.

For reference, FIGS. 12 and 13 show a structure in which the middle roof rail 9 is coupled to the roof side tubes 7 by welding, and $CO_2$ welding or laser welding may be applied therefor.

Naturally, the rear roof rail 5 may also be coupled to the roof side tubes 7 by the same method as the middle roof rail 9.

While the invention has been shown and described with respect to particular embodiments, it will be self-evident for those of ordinary knowledge that the invention may be variously modified and varied without departing from the spirit of the invention provided by the following claims.

What is claimed is:

1. A roof carrier for a vehicle, the roof carrier comprising:
   roof side tubes extendedly provided on opposite sides of a vehicle body along a front-rear direction of the vehicle from opposite sides of a cowl in a front side of the vehicle to opposite sides of a rear roof rail in a rear side of the vehicle while providing a closed cross section;
   at least one middle roof rail extendedly provided along a transverse direction of the vehicle to connect the roof side tubes on opposite sides between the cowl and the rear roof rail while providing a closed cross section;
   a roof mounting bracket coupled to the at least one middle roof rail, wherein a dent portion of the roof mounting bracket is locally dented downwardly in a portion configured to be coupled to a roof; and
   a second middle roof rail provided between the middle roof rail and the rear roof rail, wherein a roof mounting bracket and an additional roof mounting bracket are coupled to front and rear sides, respectively, of the second middle roof rail.

2. The roof carrier of claim 1, wherein the at least one middle roof rail includes a first roof rail provided at a position supporting an upper end of a front windshield glass.

3. The roof carrier of claim 2, wherein the closed cross section of each of the roof side tubes is a shape in which a plurality of straight portions are connected to each other in turn by a plurality of bent portions, thereby providing a single closed curve.

4. The roof carrier of claim 3, further comprising:
   a glass support panel coupled to a section of the roof side tubes from the cowl to the first roof rail to support the front windshield glass; and
   a strip support panel coupled to a lower side of the roof side tubes to mount a filler weather strip.

5. The roof carrier of claim 3,
   wherein the closed cross section of the roof side tubes is integrally provided with a glass support portion that is able to independently support the front windshield glass, and
   wherein a strip support panel is coupled to the roof side tubes to mount a filler weather strip.

6. The roof carrier of claim 2, further comprising:
   a glass mounting bracket coupled to a front side of the first roof rail, wherein the glass mounting bracket is configured to mount the front windshield glass, and wherein the roof mounting bracket is coupled to a rear side of the first roof rail.

7. The roof carrier of claim 6,
   wherein the at least one middle roof rail includes a second roof rail provided between the first roof rail and the rear roof rail, and wherein additional roof mounting brackets configured to mount the roof are coupled to front and rear sides, respectively, of the second roof rail.

8. The roof carrier of claim 1, wherein the cowl comprises:
a cowl upper member extendedly provided along the transverse direction of the vehicle in a predetermined closed cross-sectional shape including a closed curve; and
a cowl lower panel coupled to a lower side of the cowl upper member to partition front and rear sides of the vehicle, at least some section of the cowl lower panel having a predetermined cross-sectional structure along the transverse direction of the vehicle.

9. The roof carrier of claim 1, wherein the rear roof rail is extendedly provided along the transverse direction of the vehicle while providing a predetermined closed cross section including a closed curve.

10. The roof carrier of claim 9, wherein the roof mounting bracket is coupled to a front of the rear roof rail.

11. The roof carrier of claim 9, wherein a tailgate mounting bracket configured to mount a tailgate is coupled to a rear of the rear roof rail.

12. A vehicle comprising:
a vehicle body having a roof, a left side and a right side opposite the left side;
a cowl at a front end of the vehicle;
a rear roof rail at a rear end of the vehicle;
a first roof side tube extendedly provided on the left side of the vehicle body along a front-rear direction of the vehicle from a first side of the cowl to a first side of the rear roof rail;
a second roof side tube extendedly provided on the right side of the vehicle body along the front-rear direction of the vehicle from a second side of the cowl, opposite the first side of the cowl, to a second side of the rear roof rail, opposite the first side of the rear roof rail;
a middle roof rail extendedly provided along a transverse direction of the vehicle to connect the first and the second roof side tubes between the cowl and the rear roof rail;
a roof mounting bracket coupled to the middle roof rail, wherein a dent portion of the roof mounting bracket is locally dented downwardly in a portion coupled to the roof; and
a second middle roof rail provided between the middle roof rail and the rear roof rail, wherein a roof mounting bracket and an additional roof mounting bracket are coupled to front and rear sides, respectively, of the second middle roof rail.

13. The vehicle of claim 12, further comprising a front windshield glass, wherein the front windshield glass is supported by the middle roof rail.

14. The vehicle of claim 13, further comprising:
a glass support panel coupled to a section of the first roof side tube from the cowl to the middle roof rail;
a strip support panel coupled to a lower side of the first roof side tube; and
a filler weather strip mounted to the strip support panel.

15. The vehicle of claim 13, further comprising a glass mounting bracket coupled to a front side of the middle roof rail, wherein the glass mounting bracket is configured to mount the front windshield glass, wherein the roof mounting bracket is coupled to a rear side of the middle roof rail, and wherein the roof mounting bracket is configured to mount the roof.

16. The vehicle of claim 12, wherein the cowl comprises:
a cowl upper member extendedly provided along the transverse direction of the vehicle in a predetermined closed cross-sectional shape including a closed curve; and
a cowl lower panel coupled to a lower side of the cowl upper member to partition the front end and the rear end of the vehicle, at least some section of the cowl lower panel having a predetermined cross-sectional structure along the transverse direction of the vehicle.

17. The vehicle of claim 12,
wherein a roof mounting bracket is coupled to a front of the rear roof rail,
wherein the vehicle further comprises a tailgate mounting bracket coupled to a rear of the rear roof rail, and
wherein the rear roof rail is extendedly provided along the transverse direction of the vehicle and has a predetermined closed cross section including a closed curve.

* * * * *